United States Patent
Zurek et al.

(10) Patent No.: US 7,961,900 B2
(45) Date of Patent: Jun. 14, 2011

(54) COMMUNICATION DEVICE WITH SINGLE OUTPUT AUDIO TRANSDUCER

(75) Inventors: Robert A. Zurek, Antioch, IL (US);
Greg R. Black, Vernon Hills, IL (US);
Joel A. Clark, Wolodridge, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1750 days.

(21) Appl. No.: 11/170,358

(22) Filed: Jun. 29, 2005

(65) Prior Publication Data

US 2007/0019820 A1   Jan. 25, 2007

(51) Int. Cl.
*H04R 1/20* (2006.01)
*H04R 9/06* (2006.01)
*H04M 1/00* (2006.01)

(52) U.S. Cl. ..... 381/354; 381/334; 381/337; 455/569.1; 379/433.02; 379/433.12

(58) Field of Classification Search .......... 381/345, 381/351–354, 87, 332–338; 455/569.1, 575.1–575.3, 455/90.3; 379/433.01–433.03, 433.11–433.13, 379/432; 181/175, 185, 186, 198, 199
See application file for complete search history.

(56) References Cited

U.S. PATENT DOCUMENTS

| | | | | |
|---|---|---|---|---|
| 5,963,640 | A * | 10/1999 | Rabe | 379/433.02 |
| 6,002,949 | A * | 12/1999 | Hawker et al. | 455/569.1 |
| 6,064,894 | A | 5/2000 | Zurek et al. | |
| 6,104,808 | A * | 8/2000 | Alameh et al. | 379/433.02 |
| 6,453,045 | B1 | 9/2002 | Zurek et al. | |
| 6,636,750 | B1 * | 10/2003 | Zurek et al. | 455/569.1 |
| 6,758,303 | B2 * | 7/2004 | Zurek et al. | 381/351 |
| 7,092,745 | B1 * | 8/2006 | D'Souza | 455/575.1 |
| 7,280,666 | B2 * | 10/2007 | Guyot et al. | 381/351 |
| 7,343,181 | B2 * | 3/2008 | Chan et al. | 455/575.3 |
| 7,382,048 | B2 * | 6/2008 | Minervini | 257/723 |

OTHER PUBLICATIONS

Chinese Patent Office, "Office Action" For China Pat. Appln. No. 200610095725.9, Sep. 5, 2008, 8 Pages.
Chinese Patent Office, "Office Action" For China Pat. Appln. No. 200610095725.9, Sep. 4, 2009, 7 Pages.

* cited by examiner

*Primary Examiner* — Xu Mei
(74) *Attorney, Agent, or Firm* — Randi L. Karpinia; Sylvia Chen

(57) ABSTRACT

A communication device 100 includes a first audio output 105; a second audio output 110; an audio transducer 115 for dual mode use; a shuttered acoustic path 120 coupled between the audio transducer 115 and the first audio output 105; and an attenuated acoustic path 125 coupled between the audio transducer 115 and the second audio output 110.

16 Claims, 8 Drawing Sheets

COMMUNICATION DEVICE WITH SINGLE OUTPUT AUDIO TRANSDUCER

FIELD OF INVENTION

The present invention relates to a communication device; and more particularly, the present invention relates to a system for enhanced audio operation within a communication device.

BACKGROUND OF THE INVENTION

Acoustic performance is an important product differentiator among communication devices. A communication device, such as a portable radiotelephone, employs a speaker to convert electrical signals into sound waves in the human-audible frequency range of 20 Hertz (Hz) to 20,000 kilo-Hertz (kHz). When positioned against the user's ear during operation, the speaker enables a user of the radiotelephone to hear a representation of a caller's voice, as well as other sounds such as dial tones.

In addition to the traditional operation where the communication device is held close to a user's ear, the newer generation of communication devices offers hands-free speakerphone operation. Further, most communication devices also employ an alert transducer for audible notification of various operations including incoming messages, alarms, and the like.

A variety of techniques have been developed to detect whether the communication device is operating in a close-talking mode, speakerphone mode, or audible alert mode. In one technique, for example, a host processor keeps track of the current operating mode of the device based on user selection. If a user selects the speakerphone option, then the host processor sets a number of device parameters such as echo cancellation thresholds, microphone sensitivity and high audio speaker output level to optimize the performance of the device in that mode. Another technique for detecting whether the communication device is operating in a close-talking, speakerphone mode, or audible alert mode utilizes the outputs of gravitational sensors. According to this technique, the processor not only keeps track of the current mode, but will also switch from one operating mode to the other based on the output from the gravitational sensors.

It is desirable to use the same speaker for the earpiece audible operation, the speakerphone operation, and the alert operation in order to minimize cost and size of the communication device. One problem with such multiple-utilizations is that the alert and/or speakerphone audio level at the earpiece during close talking would tend to exceed a typical person's required limit for comfort or safety.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
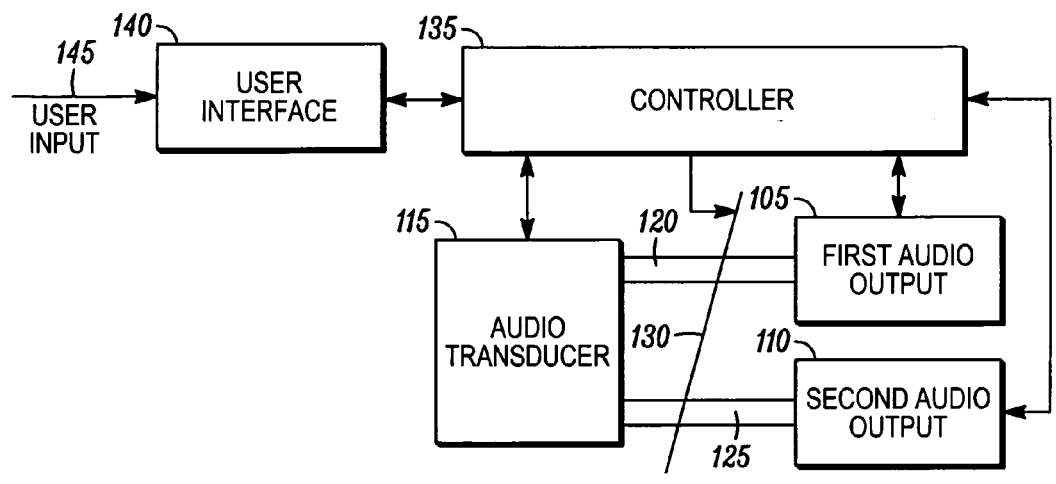
FIG. 1 is an example block diagram of communication device in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail the apparatus and method within a communication device having a single output audio transducer in accordance with the present invention, it should be observed that the present invention resides primarily in combinations of method steps and apparatus components related to the apparatus and method within a communication device having a single output audio transducer. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated the apparatus and method within a communication device having a single output audio transducer described herein may be comprised of one or more conventional processors and unique stored program instructions that control the one or more processors to implement, in conjunction with certain non-processor circuits, some, most, or all of the functions of the apparatus and method within a communication device having a single output audio transducer described herein. The non-processor circuits may include, but are not limited to, a radio receiver, a radio transmitter, signal drivers, clock circuits, power source circuits, and user input devices. As such, these functions may be interpreted as steps of a method to perform the method for interpreting user input in an electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Referring to FIG. 1, an electronic block diagram of a communication device 100 is illustrated. It will be appreciated by one of ordinary skill in the art that the communication device 100, in accordance with the present invention, can be a mobile cellular telephone, a mobile radio data terminal, a mobile cellular telephone having an attached or integrated data terminal, a two-way messaging device, or an equivalent. Similarly, the communication device 100 can be any other electronic device such as a personal digital assistant or a laptop computer having wireless communication capabilities. In the following description, the term "communication device" refers to any combination of the devices mentioned above or an equivalent.

It will further be appreciated by one of ordinary skill in the art that the communication device, in accordance with the present invention, can operate within wide area networks utilizing at least one of several standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-136 Time Division Multiple Access (TDMA) digital cellular system, the IS-95 Code Division Multiple Access (CDMA) digital cellular system, the CDMA 2000 system, the Wideband CDMA (W-CDMA) system, the Personal Communications System (PCS), the Third Generation (3G) system, the Universal Mobile Telecommunications System (UMTS) and variations and evolutions of these protocols. In the following description, the term "communication system" refers to any of the systems mentioned above or an equivalent. Additionally, it is envisioned that communication systems can include wireless local area networks, including pico-networks, or the like, utilizing at least one of several standards. These standards include but are not limited to Bluetooth, ZigBee (802.16.4), WiFi (wireless fidelity, 802.11), WiMax (802.16e), and the like. Additionally, it is envisioned that the communication device 100 can be employed in cordless telephone applications, utilizing at least one of several standards. These standards include but are not limited to Analog systems, DECT (Digital European Cordless Telecommunications), and the like.

As illustrated in FIG. 1, the communication device 100 includes a first audio output 105 and a second audio output 110. The first audio output 105, for example, can be a speakerphone or alternatively can be an audio alerting mechanism. The second audio output 110, for example, can be an earpiece.

The communication device 100 further includes an audio transducer 115 for dual mode use. The first audio output 105 and the second audio output 110 can, for example, be used for outputting audio communications and audio alerts for a user to hear. For example, by driving the audio transducer 115 with an oscillating signal that is in the audio frequency range, the audio transducer 115 is induced to emit an audible sound, e.g., a beep. Alternatively, the audio transducer 115 can be driven with an audio signal that includes voice, music or other complex sounds. For example, a frequency range of about 300 to 4000 Hertz is suitable for voice signals.

Within the communication device 100, a shuttered acoustic path 120 is coupled between the audio transducer 115 and the first audio output 105. The shuttered acoustic path 120 preferably includes a movable shutter 130 which opens the shuttered acoustic path 120 when the first audio output 105 is active. Further the movable shutter 130 closes the shuttered acoustic path 120 when the second audio output 110 is active.

Within the communication device 100, an attenuated acoustic path 125 is coupled between the audio transducer 115 and the second audio output 110. Preferably, the attenuated acoustic path 125 remains open independent of the movable shutter 130 closing or opening the shuttered acoustic path 120. In an alternate embodiment, the movable shutter 30 is mechanically coupled to the attenuated acoustic path 125. In this alternate embodiment, the movable shutter 130 closes the attenuated acoustic path 125 simultaneously with opening the shuttered acoustic path; and opens the attenuated acoustic path 125 simultaneously with closing the shuttered acoustic path 120. In one embodiment, the attenuated acoustic path includes a passive porting (not shown). For example, when the second audio output 110 is an earpiece, the passive porting can be an earpiece seal. In one embodiment, the attenuated acoustic path further includes one or more of an acoustic resistive element, a viscous loss element, and an acoustic mass element (all not shown).

As illustrated in FIG. 1, the communication device 100 further includes a controller 135. The controller 135, in one embodiment, is coupled to the movable shutter 130 for controlling positioning of the movable shutter 130 in response to activation of either the first audio output 105 or the second audio output 110. For example, the controller 135 can cause the movable shutter 130 to open the shuttered acoustic path 120 when the first audio output 105 is active. Further, the controller 135 can cause the movable shutter 130 to close the attenuated acoustic path 125 simultaneously with opening the shuttered acoustic path 120. The controller 135 can further cause the movable shutter 130 to close the shuttered acoustic path 120 when the second audio output is active.

The controller 135, in a second embodiment, is coupled to the movable shutter 130 for sensing of the shutter positioning, and controlling the handset operation accordingly. For example, the controller 135 can sense that the movable shutter 130 is moved from an open to a closed position and in response cause the handset mode to change from an alert mode to a voice call mode. Further, the controller 135 can sense the movable shutter 130 is moved from a closed position to an open position and in response cause the handset mode to change from voice call mode to stand-by mode.

The communication device 100 further includes a user interface 140 for receiving a user input 145. The user interface 140, upon receiving the user input 145, can signal the controller 135 to change the positioning of the movable shutter 130.

The present invention, as described herein provides loud ringer/speakerphone operation in the shutter open case and an earpiece privacy mode having reduced maximum volume in the shutter closed case, without relying on an automatic gain adjustment circuit.

Figure 2:
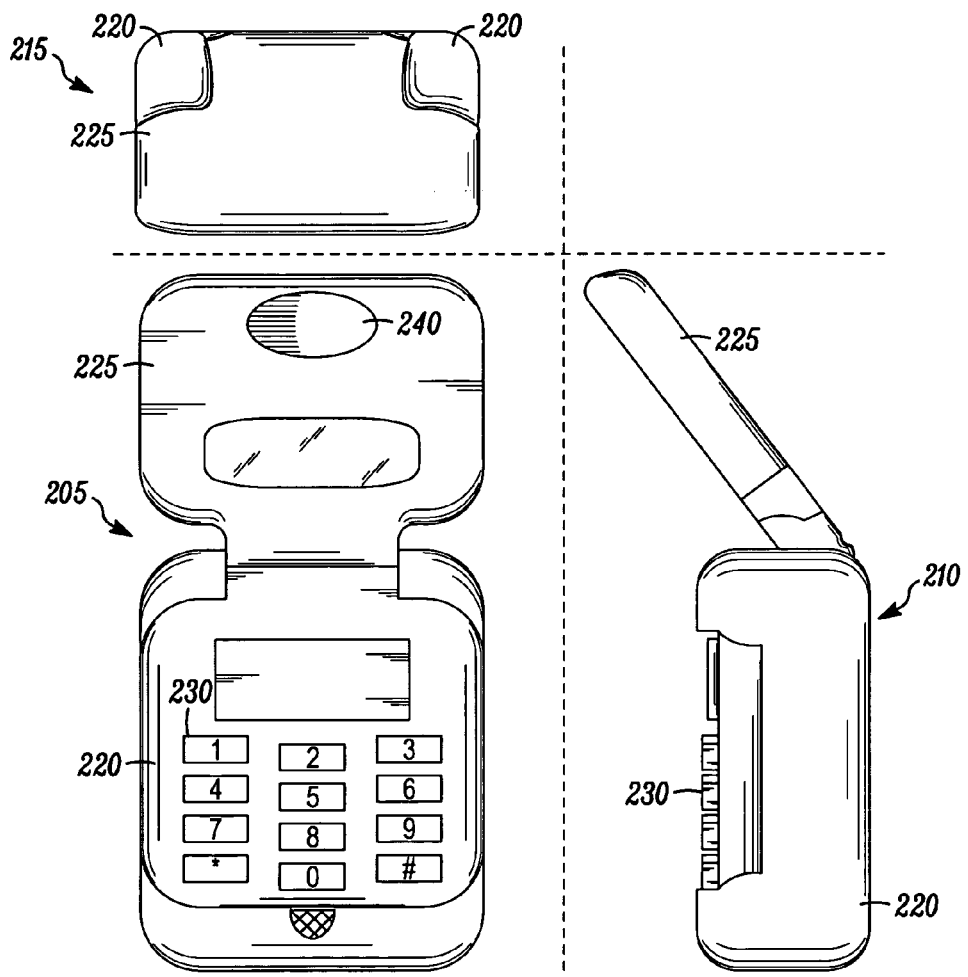
FIG. 2 is an example flip-type communication device in an open position in accordance with some embodiments of the invention.

Referring to FIG. 2, a flip-type communication device 200 in an open position in accordance with some embodiments of the invention is illustrated. Specifically, a front view 205, a side view 210, and a top view 215 of the flip-type communication device 200 in an open position are shown.

As illustrated, the flip-type communication device 200 comprises a base housing 220 and a flip housing 225. The flip housing 225 is preferably a hinged cover that closes to make the flip-type communication device 200 more compact and to protect a keypad 230 or other user interface located on the base housing 220 from inadvertent entries. As an example, a communication device such as a radiotelephone can comprise two planar elements coupled by a hinge. When the radiotelephone is not in use, the two planar elements are closed and lie in parallel (see FIG. 3). When the radiotelephone is in use, the two planar elements are opened in relation to each other, exposing such elements as a touch pad, viewing screen, microphone and/or speaker as shown in FIG. 2.

It will be appreciated by those of ordinary skill in the art that the base housing 220 and the flip housing 225 can each have, and/or contain printed circuit boards (PCBs) with electronic components, audio devices, cameras, visual displays, metal shields, and metal chassis, as well as wiring to connect the electrical component together to form electrical circuits, and the like.

As illustrated in FIG. 2, the flip-type communication device 200 includes a single loudspeaker (not shown) within the base housing 220. The flip-type communication device 200 further includes an acoustic port (not shown) on the top of the base housing 220. When the flip housing 225 is open the flip housing 225 covers the acoustic port with a lossy port extension to lower the radiated sound pressure level, thereby allowing a privacy mode.

Figure 3:
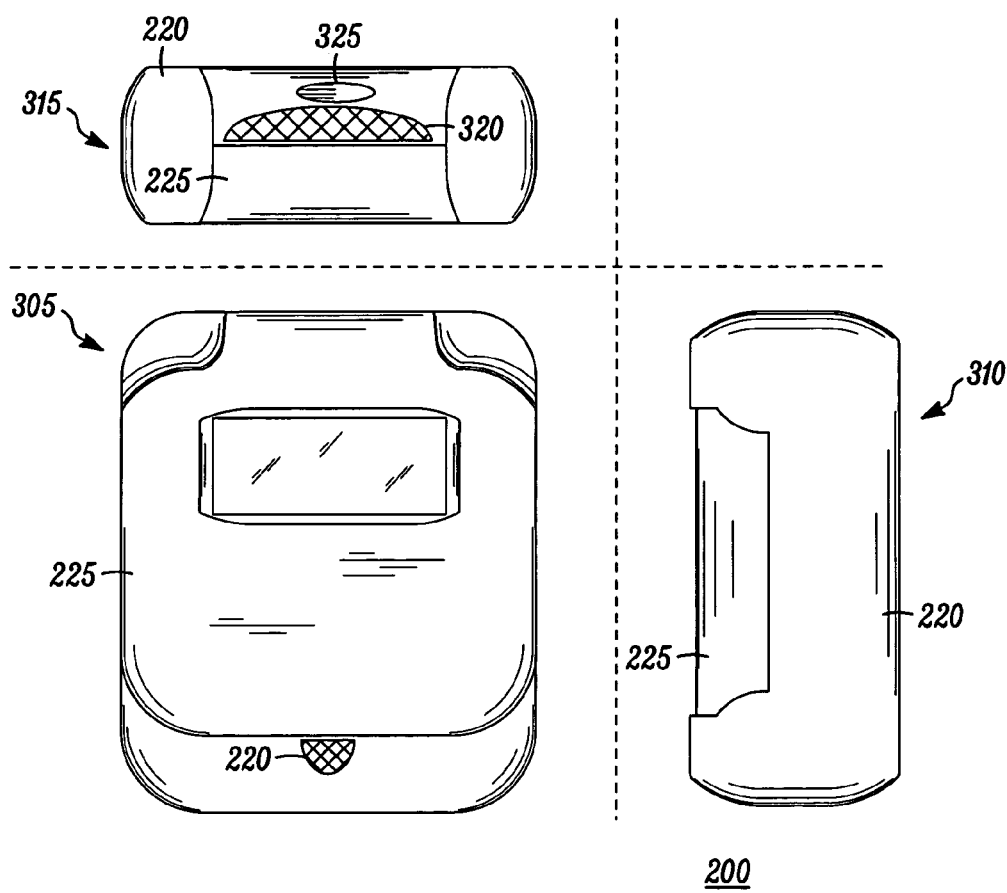
FIG. 3 is an example flip-type communication device in a closed position in accordance with some embodiments of the invention.

Referring to FIG. 3, the flip-type communication device 200 in a closed position in accordance with some embodiments of the invention is illustrated. Specifically, a closed front view 305, a closed side view 310, and a closed top view 315 of the flip-type communication device 200 in a closed position are shown.

As illustrated in FIG. 3, when closed, the flip housing 225, in accordance with the present invention, does not cover the acoustic port 320, thereby allowing a handsfree mode. As an alternative to the flip housing 225 covering the loudspeaker 235, a ball or cylindrical hinge can be utilized to couple the base housing 220 speakerphone porting to the flip housing 225 earpiece porting.

The flip-type communication device 200 further includes an acoustic port 320 on the top of the base housing 220 which when the flip housing 225 is closed provides the correct speakerphone tuning. The acoustic port extension is an attenuated path to the earpiece region in the flip housing 225 for private operation such that the maximum ringer or speaker phone level transmitted through this path is below our required limit for comfort or safety. When the flip housing 225 is closed the acoustic port extension is not coupled to the acoustic port 320. When the flip housing 225 is open, the acoustic port extension is coupled to the acoustic port 320.

The system as described previously herein provides an attenuated path to the earpiece 240 such that the maximum audio level into a sealed ear is below a typical required limit for comfort or safety. The invention incorporates both mass loading and acoustic resistive damping to reduce the sound pressure level at the ear from the speakerphone level at the loudspeaker 235. In order to produce a leak tolerant design with this methodology, a passive porting network (se FIGS. 5 and 6, for example) can be added to the earpiece region of the flip-type communication device 200.

In one embodiment of the present invention, a user interface such as a hook switch 325 provides a call-answer functionality when pressed, and a call-release functionality when pressed again. The hook switch 325 can be depressed manually for going right into a non-private speaker phone mode, or depressed by the flip housing 225 for automatic answering when opening the flip housing 225.

Figure 4:
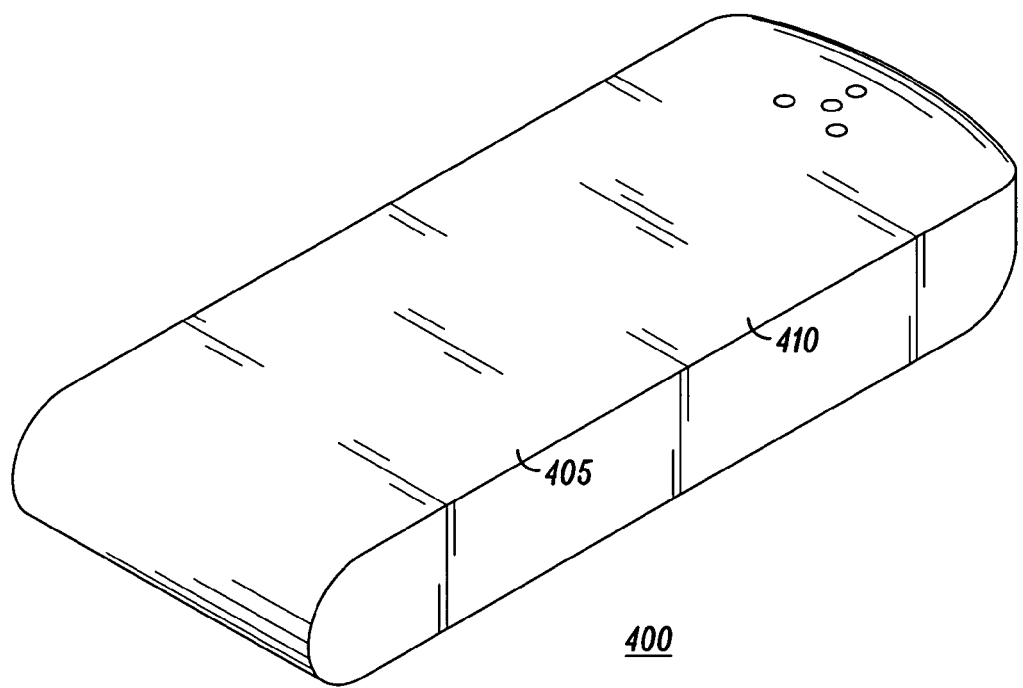
FIG. 4 is a front view of an example candybar-type communication device in accordance with some embodiments of the invention.

FIG. 4 is a front view of an example candybar-type communication device 400 in accordance with some embodiments of the invention. The candybar-type communication device 400, as illustrated, includes a housing 410 for covering, protecting and supporting the internal components encased within. The internal components, for example, can include conventional cellular telephone hardware (not represented for simplicity) such as user interfaces that are integrated in a compact housing, an antenna system, and the like. Similarly, the internal components can include printed circuit boards (PCBs) with electronic components, audio devices, cameras, visual displays, metal shields, and metal chassis, as well as wiring to connect the electrical components together to form electrical circuits, and the like.

By way of example, the invention is illustrated in FIG. 4 and herein described in relation to a fixed housing, however, it will be appreciated by one of ordinary skill in the art that the present invention is similarly applicable to a removable housing accessory such as the removable faceplate described in U.S. Pat. No. 5,884,772, issued Mar. 23, 1999 to Floyd et al. and titled "Electronic Device Having Multiple User Interface Configurations" which is assigned to the assignee of the present invention, and which is incorporated by reference herein. Similarly, the present invention is equally applicable to interchangeable covers for housings such as described in U.S. Pat. No. 5,745,566, issued Apr. 28, 1998 to Petrella et al. and titled "Portable Communication Device Having Removable Escutcheon Elements" which is assigned to the assignee of the present invention, and which is incorporated by reference herein.

As illustrated, the candybar-type communication device 400 includes a loudspeaker 405 located within the housing 410.

Figure 5:
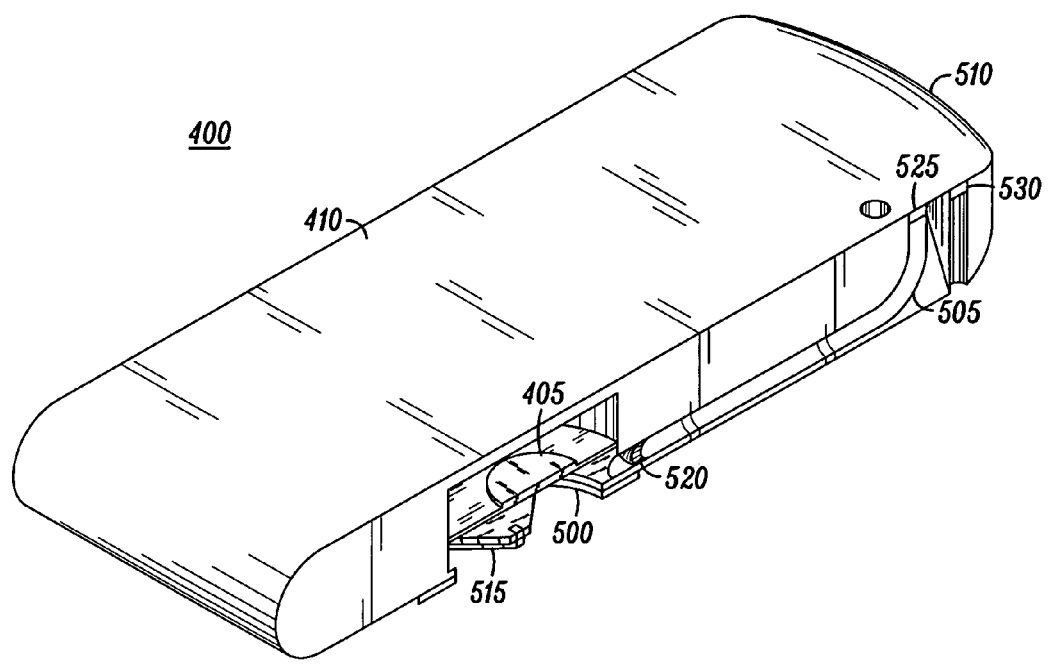
FIG. 5 is a cross-section view of one embodiment of the candybar-type communication device of FIG. 4 in accordance with some embodiments of the invention.

FIG. 5 is a cross-section view of one embodiment of the candybar-type communication device 400 of FIG. 4 in accordance with some embodiments of the invention. As illustrated, the candybar-type communication device 400 has an acoustic shutter 500 on the housing 410 (illustrated in an open position) which when closed covers the loudspeaker 405 to lower the unsealed sound pressure level, thereby allowing a privacy mode. An attenuated path 505 to an earpiece 510 is provided in parallel to the speaker porting 515 for loudspeaker operation such that the maximum ringer or speaker phone level transmitted through this parallel path 505 is within the listener's comfort level. Acoustic resistance materials 520, 525,535 are shown in the attenuated path 505, and in the earpiece 510.

Figure 6:
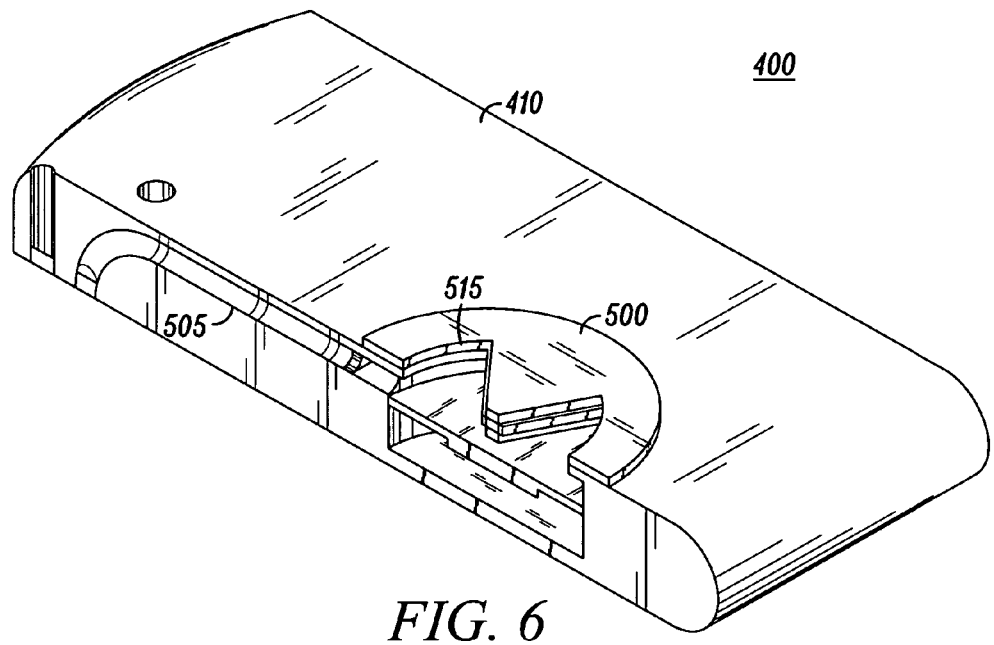
FIG. 6 a second cross-section view of one embodiment of the candybar-type communication device of FIG. 4 in accordance with some embodiments of the invention.

FIG. 6 a second cross-section view of one embodiment of the candybar-type communication device 400 of FIG. 4 in accordance with some embodiments of the invention. As in FIG. 5, FIG. 6 illustrates the acoustic shutter 500 in an open position.

Figure 7:
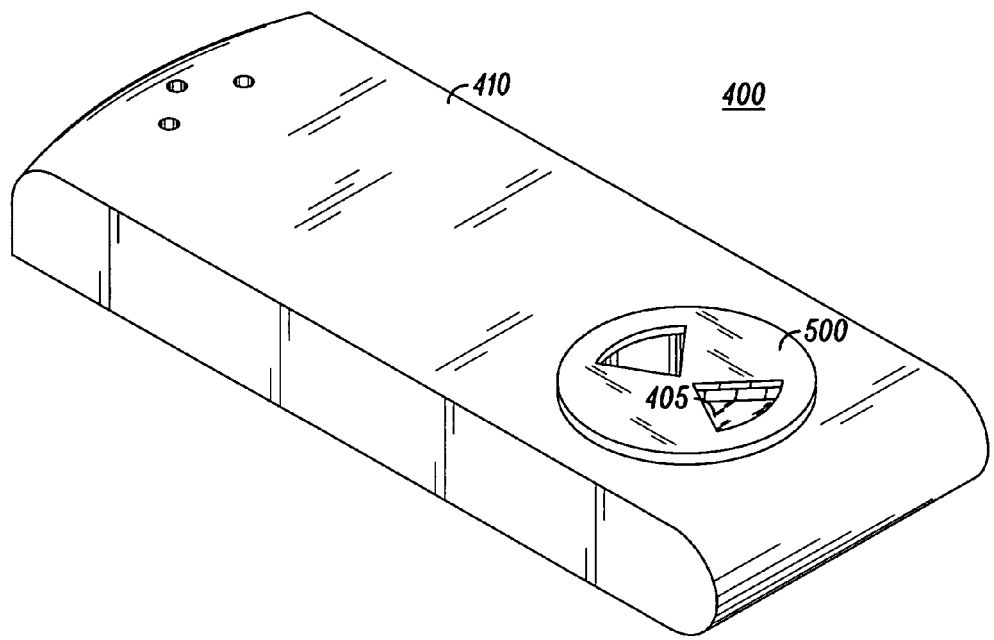
FIG. 7 is a back view of an example candybar-type communication device in accordance with some embodiments of the invention.

FIG. 7 is a back view of an example candybar-type communication device 400 in accordance with some embodiments of the invention. The candybar-type communication device 400 includes a single loudspeaker 405 located in the lower back portion of the housing. FIG. 7 illustrates the acoustic shutter 500 in an open position.

Figure 8:
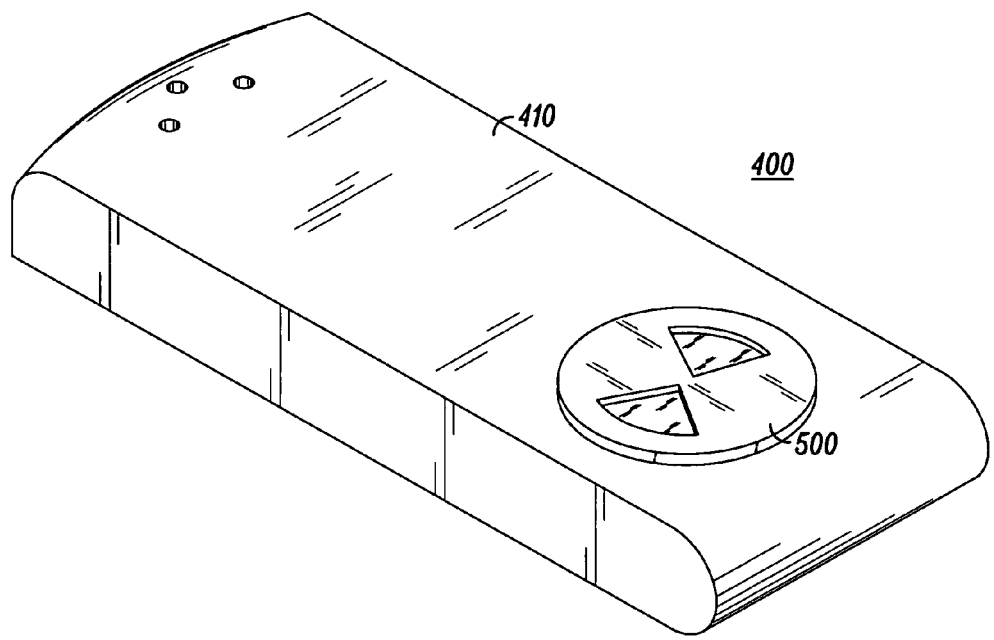
FIG. 8 is a second back view of an example candybar-type communication device in accordance with some embodiments of the invention.

FIG. 8 is a second back view of an example candybar-type communication device 400 in accordance with some embodiments of the invention. FIG. 8 illustrates the acoustic shutter 500 in a closed position.

Figure 9:
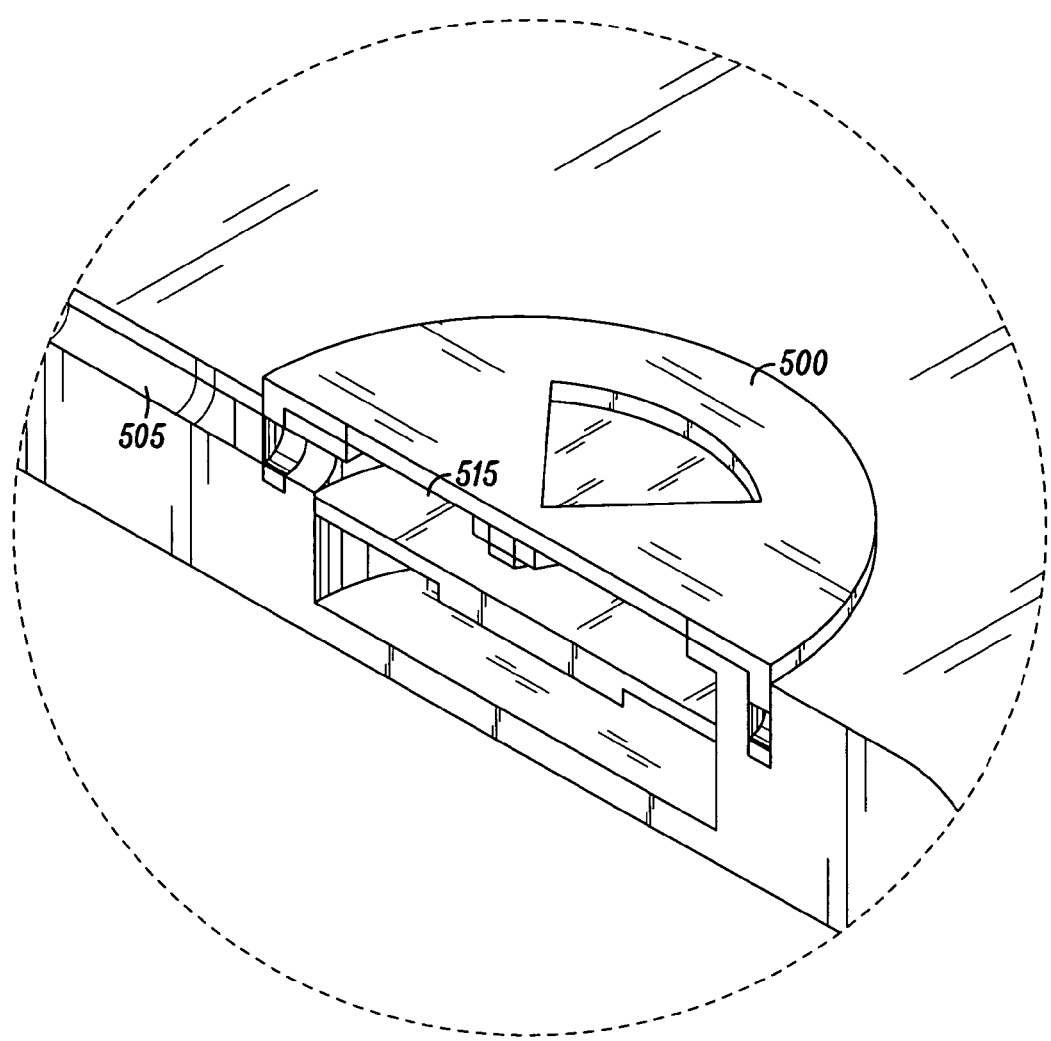
FIG. 9 is cross-section view of an alternate embodiment of the candybar-type communication device of FIG. 4 in accordance with some embodiments of the invention.

FIG. 9 is cross-section view of an alternate embodiment of the candybar-type communication device 400 of FIG. 4 in accordance with some embodiments of the invention. Specifically, FIG. 9 illustrates an alternate embodiment in which the acoustic shutter 500 is shown in a closed position. In this embodiment, when the acoustic shutter 500 closes the speaker porting 515, it opens the attenuated path 505 to an earpiece 510.

Figure 10:
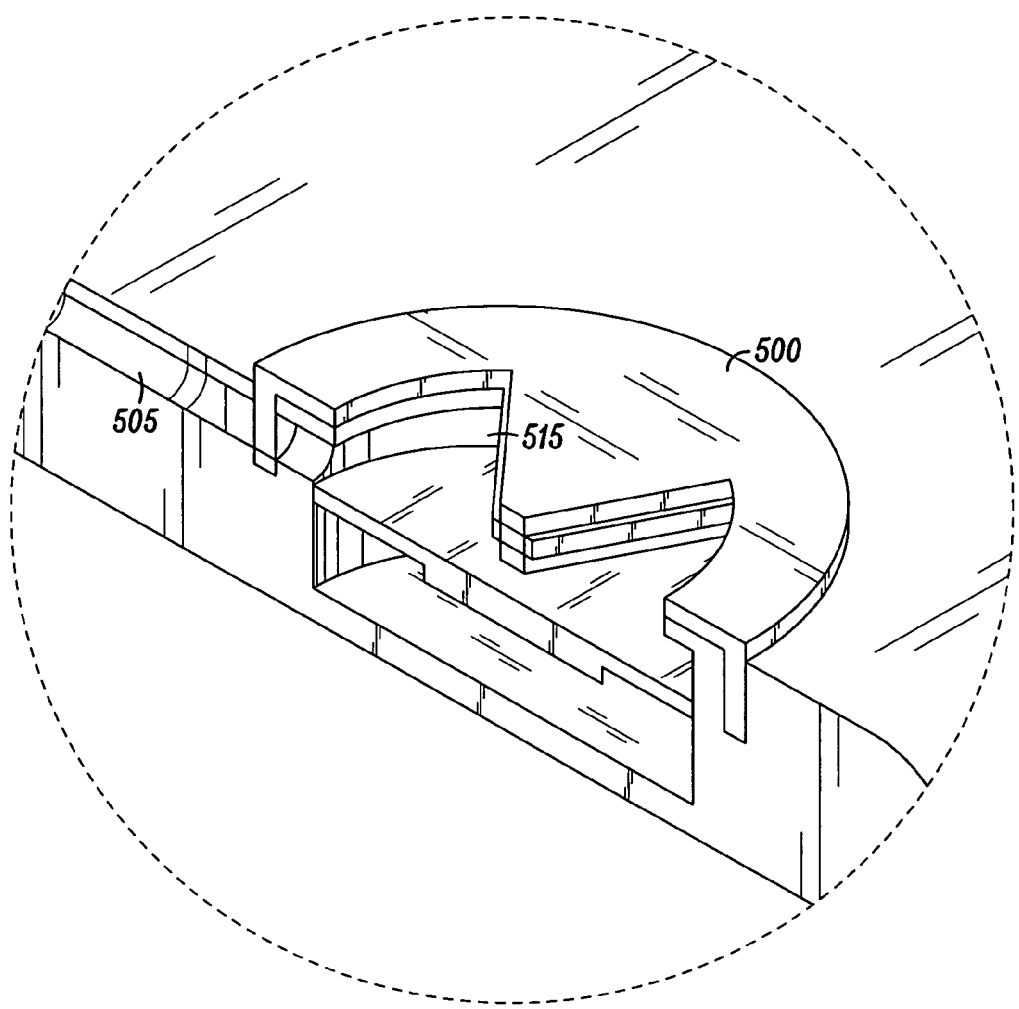
FIG. 10 is a second cross-section view of an alternate embodiment of the candybar-type communication device of FIG. 4 in accordance with some embodiments of the invention.

FIG. 10 is a second cross-section view of an alternate embodiment of the candybar-type communication device 400 of FIG. 4 in accordance with some embodiments of the invention. Specifically, FIG. 10 illustrates the alternate embodiment of FIG. 9 with the acoustic shutter 500 in an open position. In this embodiment, when the acoustic shutter 500 opens the speaker porting 515, it closes the attenuated path 505 to an earpiece 510.

As illustrated in the various figures and description herein, the invention incorporates mass loading, viscous losses down the extended port tube, and acoustic resistive damping materials to reduce the sound pressure level at the ear. In order to produce a "leak tolerant" design as well as correct the frequency response errors added in due to the long lossy port tube a passive porting network (not shown) is added to the earpiece region of the phone. An alternative to the shutter covering the loudspeaker openings is the shutter closing off the porting to the earpiece when the speakerphone ports are open and open the porting to the earpiece when the speakerphone ports are closed.

In order to cost effectively implement this invention in a communication device, three sides of the extended porting structure could be molded in the phone housing, with an additional flat piece of plastic attached over the three sided structure, to form the extended port. This additional piece could be attached in any one of the ways we have sealed off acoustic cavities in the past, such as sonic welding, adhesive, or adhesive gasket. Alternatively, the extended port could be preformed and attached to studs at both ends of the housing as is done in hearing aid manufacturer.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A communication device comprising:
    a first audio output;
    a second audio output;
    an audio transducer for dual mode use;
    a shuttered acoustic path coupled between the audio transducer and the first audio output, wherein the shuttered acoustic path includes a movable shutter; and
    an attenuated acoustic path coupled between the audio transducer and the second audio output.

2. A communication device as recited in claim 1, wherein the first audio output is selected from a group comprising a speakerphone and an audio alerting mechanism.

3. A communication device as recited in claim 1, wherein the second audio output comprises an earpiece.

4. A communication device as recited in claim 1, wherein the movable shutter opens the shuttered acoustic path when the first audio output is active.

5. A communication device as recited in claim 4, wherein the movable shutter further closes the attenuated acoustic path simultaneously with opening the shuttered acoustic path.

6. A communication device as recited in claim 1, wherein the movable shutter closes the shuttered acoustic path when the second audio output is active.

7. A communication device as recited in claim 1, wherein the attenuated acoustic path further comprises a passive porting.

8. A communication device as recited in claim 7, wherein the second audio output comprises an earpiece, and further wherein the passive porting comprises an earpiece seal.

9. A communication device as recited in claim 1, where the attenuated acoustic path includes one or more of the group comprising an acoustic resistive element, a viscous loss element, and an acoustic mass element.

10. A communication device as recited in claim 1, the communication device further comprising:
    a controller coupled to the movable shutter for controlling the positioning of the movable shutter in response to an activation of one of the first audio output and the second audio output.

11. A communication device as recited in claim 10, further comprising:
    a user interface coupled to the controller, wherein the controller causes a change in the positioning of the movable shutter in response to a user input to the user interface.

12. A communication device as recited in claim 1, the communication device further comprising:
    a controller coupled to the movable shutter, wherein the controller is adapted to cause the movable shutter to open the shuttered acoustic path when the first audio output is active.

13. A communication device as recited in claim 12, wherein the controller is further adapted to cause the movable shutter to close the attenuated acoustic path simultaneously with opening the shuttered acoustic path.

14. A communication device as recited in claim 1, the communication device further comprising:
    a controller coupled to the movable shutter, wherein the controller is adapted to cause the movable shutter to close the shuttered acoustic path when the second audio output is active.

15. A communication device as recited in claim 1, the communication device further comprising:
    a controller coupled to the movable shutter, wherein the controller is adapted to:
    sense a movement of the movable shutter from an open position to a closed position; and
    change an audible operation of the communication device from an alert mode to a voice call mode in response to the movable shutter movement.

16. A communication device as recited in claim 1, the communication device further comprising:
    a controller coupled to the movable shutter, wherein the controller is adapted to:
    sense a movement of the movable shutter from a closed position to an open position; and
    change an audible operation of the communication device from a voice call mode to a stand-by mode in response to the movable shutter movement.

* * * * *